US009975528B2

(12) United States Patent
Mashiki et al.

(10) Patent No.: US 9,975,528 B2
(45) Date of Patent: May 22, 2018

(54) DEFORMATION SUPPRESSING STRUCTURE OF VEHICLE

(71) Applicant: MITSUBISHI JIDOSHA KOGYO KABUSHIKI KAISHA, Tokyo (JP)

(72) Inventors: Takayuki Mashiki, Tokyo (JP); Takaji Kotani, Tokyo (JP); Kenta Nakanishi, Tokyo (JP); Ken Muguruma, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/356,285

(22) Filed: Nov. 18, 2016

(65) Prior Publication Data

US 2017/0144637 A1    May 25, 2017

(30) Foreign Application Priority Data

Nov. 20, 2015    (JP) .................................. 2015-228084

(51) Int. Cl.
*B60T 7/06*         (2006.01)
*B60T 11/10*        (2006.01)
(Continued)

(52) U.S. Cl.
CPC .............. *B60T 7/065* (2013.01); *B60R 21/09* (2013.01); *B60T 11/10* (2013.01); *B62D 25/082* (2013.01);
(Continued)

(58) Field of Classification Search
CPC ...................................................... B60T 7/065
See application file for complete search history.

(56) References Cited

U.S. PATENT DOCUMENTS

| 4,586,580 A | 5/1986 | Spielmann et al. |
| 5,797,264 A | 8/1998 | Verbo et al. |

(Continued)

FOREIGN PATENT DOCUMENTS

| DE | 32 03 496 A1 | 8/1983 | |
| DE | 102004008647 A1 * | 9/2005 | ............. B60R 19/00 |

(Continued)

OTHER PUBLICATIONS

Extended European Search Report dated May 16, 2017 received in EP Application No. 16199263.1.

*Primary Examiner* — Nicole T Verley
(74) *Attorney, Agent, or Firm* — Birch, Stewart, Kolasch & Birch, LLP (57) ABSTRACT

A deformation suppressing structure of a vehicle includes a dash panel separating a driving unit space for installing a weight component and a vehicle interior space for a passenger to ride, a brake component disposed inside the driving unit space and between the weight component and the dash panel to control a hydraulic pressure of a brake system, and a protecting member fixed to the dash panel and accommodating the brake component. The protecting member includes a guide surface configured such that a contact point at which the guide surface contacts the weight component changes during a backward movement of the weight component at the time of a collision of the vehicle, and a contacting portion arranged to contact the dash panel at a location above a fixing point at which the protecting member and the dash panel are fixed to each other and above the contact point.

1 Claim, 6 Drawing Sheets

(51) Int. Cl.
*B62D 25/08* (2006.01)
*B62D 25/14* (2006.01)
*B60R 21/09* (2006.01)
*G05G 1/327* (2008.04)

(52) U.S. Cl.
CPC .............. *B62D 25/14* (2013.01); *G05G 1/327* (2013.01); *B60Y 2200/92* (2013.01); *B60Y 2306/01* (2013.01)

(56) References Cited

U.S. PATENT DOCUMENTS

| | | | | |
|---|---|---|---|---|
| 5,918,950 | A | * | 7/1999 | Maeda ................. B60T 8/4291 303/116.2 |
| 2008/0048422 | A1 | * | 2/2008 | Eichhorn ............... B60T 7/065 280/748 |
| 2009/0235777 | A1 | * | 9/2009 | Sand ...................... B60R 21/01 74/560 |

FOREIGN PATENT DOCUMENTS

| | | | | |
|---|---|---|---|---|
| FR | 2980435 A1 | * | 3/2013 | ............. B60T 7/065 |
| JP | 2007-84041 A | | 4/2007 | |
| WO | WO 2005/097553 A1 | | 10/2005 | |

\* cited by examiner

DEFORMATION SUPPRESSING STRUCTURE OF VEHICLE

CROSS-REFERENCE TO RELATED APPLICATION

The present application claims priority from Japanese Patent Application No. 2015-228084 filed on Nov. 20, 2015, the entire content of which is incorporated herein by reference.

FIELD OF INVENTION

The present invention relates to a deformation suppressing structure of a vehicle.

RELATED ART

A driving unit space providing a space for installing a weight component and a vehicle interior space providing a space for passengers to ride on the vehicle are separated from each other by a dash panel. Examples of the weight component include a battery and a driving unit such as an engine and a motor. Some vehicles have a brake component provided in the driving unit space to control a hydraulic pressure of a brake system attached to the dash panel. Inside the driving unit space, the weight component is typically disposed on the vehicle front side of the brake component. Therefore, at the time of a front collision, i.e., when a collision load is applied from the front of the vehicle, the weight component that has been pushed toward the back of the vehicle may hit and displace the component of the brake system, and this may deform the dash panel toward the inside of the vehicle interior space.

In view of this, a related art structure has a guide portion provided on a master cylinder, the master cylinder being a component of the brake system and disposed between the dash panel and the battery, to direct a battery toward a lateral side of the vehicle when the battery as one of the weight components is moving backward toward the rear side of the vehicle at the time of a front collision (see JP2007-84041A).

The related art structure is configured to direct the battery toward the lateral side of the vehicle by the guide portion to prevent the dash panel from being deformed by the master cylinder. However, since there is no member provided to protect the master cylinder itself, it is difficult to avoid a collision of the master cylinder with a surrounding member resulting from its displacement due to the collision with the battery.

SUMMARY

Illustrative aspects of the present invention provide a mechanism configured to suppress a deformation of a dash panel toward an inside of a vehicle interior space by a component of the brake system while at the same time protecting the component of the brake system.

According to an illustrative aspect of the present invention, a deformation suppressing structure of a vehicle is provided. The deformation suppressing structure is configured to suppress a deformation of the vehicle at a time of a collision. The deformation suppressing structure includes a dash panel separating a driving unit space on a front side of the vehicle and a vehicle interior space on a rear side of the vehicle from each other, the driving unit space providing a space for installing a weight component, and the vehicle interior space providing a space for a passenger to ride on the vehicle, a brake component for controlling a hydraulic pressure of a brake system disposed inside the driving unit space and between the weight component and the dash panel, and a protecting member fixed to the dash panel and accommodating the brake component inside the protecting member. The protecting member includes a guide surface arranged to face the weight component and configured such that a contact point at which the guide surface contacts the weight component changes during a backward movement of the weight component at the time of the collision of the vehicle, and a contacting portion arranged to contact the dash panel at a location above a fixing point at which the protecting member and the dash panel are fixed to each other and above the contact point.

DETAILED DESCRIPTION

Hereinafter, embodiments of the present invention will be described with reference to the drawings. In the following description, the same members and members having the same function are denoted by the same reference signs, and an overlapping description thereof may be omitted. Some elements may be omitted or partially cut away from the drawings for the purpose of visibility of the drawings. In the drawings, the reference sign F indicates a front side of the vehicle or a direction toward the front side, the reference sign R indicates a rear side of the vehicle or a direction toward the rear side, the reference sign Y indicates a vertical direction of the vehicle, the reference sign Z indicates an upper side of the vehicle or a direction toward the upper side, and the reference sign W indicates a width direction of the vehicle.

Figure 1:
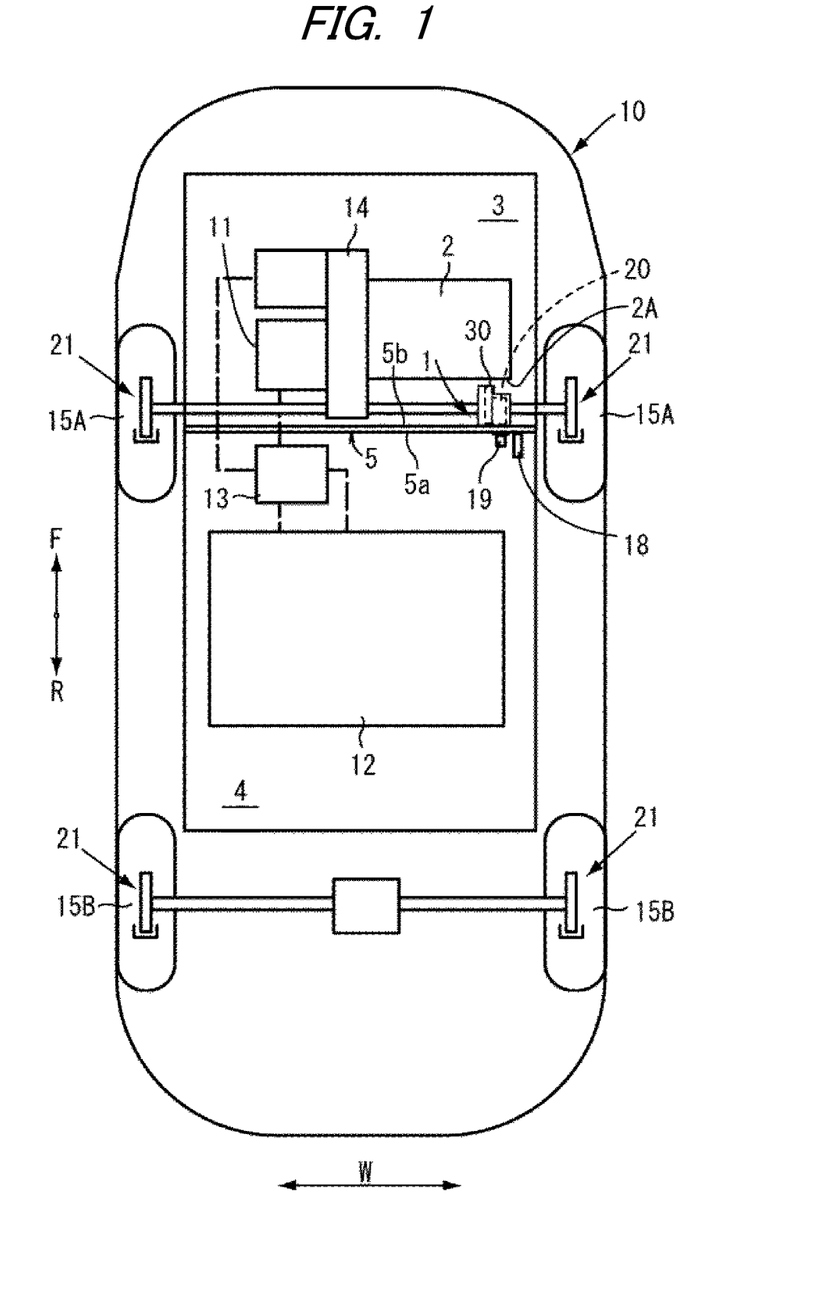
FIG. 1 is a diagram illustrating an overall structure of a vehicle having a deformation suppressing structure according to an embodiment of the present invention.

FIG. 1 is a diagram illustrating an overall structure of a hybrid vehicle 10 having a deformation suppressing structure 1 according to an embodiment of the present invention. The vehicle 10 has a driving unit space 3 formed on the vehicle front side F. On the vehicle rear side R of the driving unit space 3, a cabin 4 serving as a vehicle interior space for passengers to ride on the vehicle is formed. Between the driving unit space 3 and the cabin 4, a metal dash panel 5 having its width along the vehicle width direction W and extending in the vehicle vertical direction Y is disposed. The dash panel 5 separates the driving unit space 3 and the cabin 4 from each other. A cowl top 6 is fixed to an outer surface 5b of the dash panel 5 on the side of the driving unit space 3.

In the driving unit space 3, an engine 2 and a front motor 11 (examples of a weight component) are installed. The front motor 11 is an electric motor serving as a vehicle driving power source. In the vehicle 10, a battery 12 is mounted below the cabin 4. The electric power discharged from the battery 12 is converted into AC by an inverter 13, and then, supplied to the front motor 11. The motive power output from the front motor 11 is transmitted to right and left front driving wheels 15A through a front transaxle 14. The battery 12 is pre-charged with DC power, and is rechargeable from a power supply unit outside the vehicle and the front motor 11.

The front motor 11 is regeneratively driven and functions as a generator when driving the vehicle 10 without pressing an accelerator pedal 18 at the time of deceleration or driving downhill. The front motor 11 is regeneratively driven and functions as a generator also when a regeneration operation is performed. When the front motor 11 is regeneratively driven, AC power is generated, and after being converted into DC by the inverter 13, and the power is charged into the battery 12.

The vehicle 10 has braking devices 21 that provide a braking force to the driving wheels 15A and rear wheels 15B. On an inner surface 5a of the dash panel 5 on the vehicle interior side (cabin side), the accelerator pedal 18 that controls the vehicle speed and a brake pedal 19 that actuates the braking devices 21 are attached and disposed. The braking devices 21 generate the braking force by sandwiching, with brake pads, disks rotating integrally with the wheels by causing hydraulic pressure in response to the brake pedal 19 being pressed. The braking devices 21 may have a known configuration. In the present embodiment, a by-wire type is used as the braking devices 21.

The braking devices 21 are controlled such that when the front motor 11 is rotated to obtain a regenerative braking force, the hydraulic pressure caused by the pressing of the brake pedal 19 is caused so as to be lower than a normal value and when no regenerative braking force of the front motor 11 is obtained, the hydraulic pressure caused by the pressing of the brake pedal 19 is caused at the normal value. The vehicle 10 has a regenerative coordinated brake operating system (hereinafter, "BOS") 20 as a brake component that controls the hydraulic pressure of the brake system.

Figure 2:
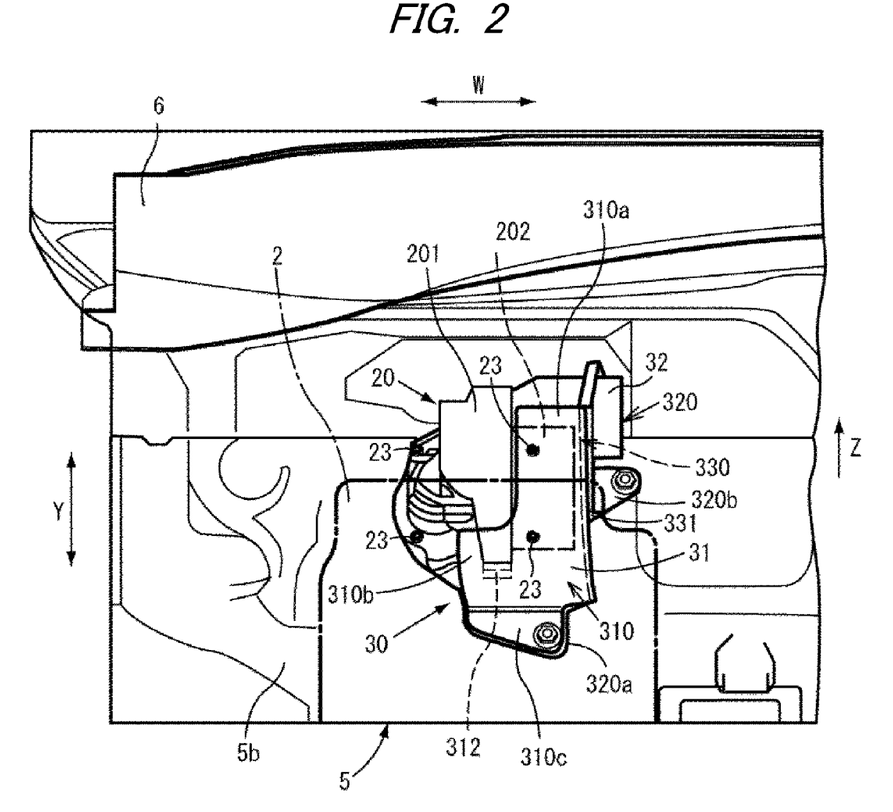
FIG. 2 is a front view of the deformation suppressing structure and its surrounding structure, viewed from a front of the vehicle.

As shown in FIG. 2, the BOS 20 has a hydraulic pressure circuit portion 201 having a flow channel where brake oil as hydraulic oil flows inside the hydraulic pressure circuit portion 201 and a control board 202 configured to switch the flow channel of the hydraulic pressure circuit portion 201. The control board 202 has its upper part 202a and lower part 202b protruding from the hydraulic pressure circuit portion 201 in the vehicle vertical direction Y. As shown in FIG. 1, the BOS 20 is disposed between a rear part 2A of the engine 2 and the outer surface 5b of the dash panel 5 and below the cowl top 6 in view of layout considerations.

The BOS 20, actuated by an operation of the brake pedal 19, and the brake pedal 19 are provided on opposite sides of the dash panel 5. Thus, when the vehicle 10 have a collision (head-on collision) and a collision load is applied from the vehicle front side F, the engine 2 is pushed toward the vehicle rear side R to collide with the BOS 20 and to displace the BOS 20, so that the dash panel 5 may be deformed toward the inside of the cabin 4. Moreover, when the dash panel 5 is deformed toward the inside of the cabin 4, depending on the deformation, the brake pedal 19 may be pushed out in a direction away from the dash panel 5 (in a direction protruding toward the inside of the cabin 4).

Figure 4:
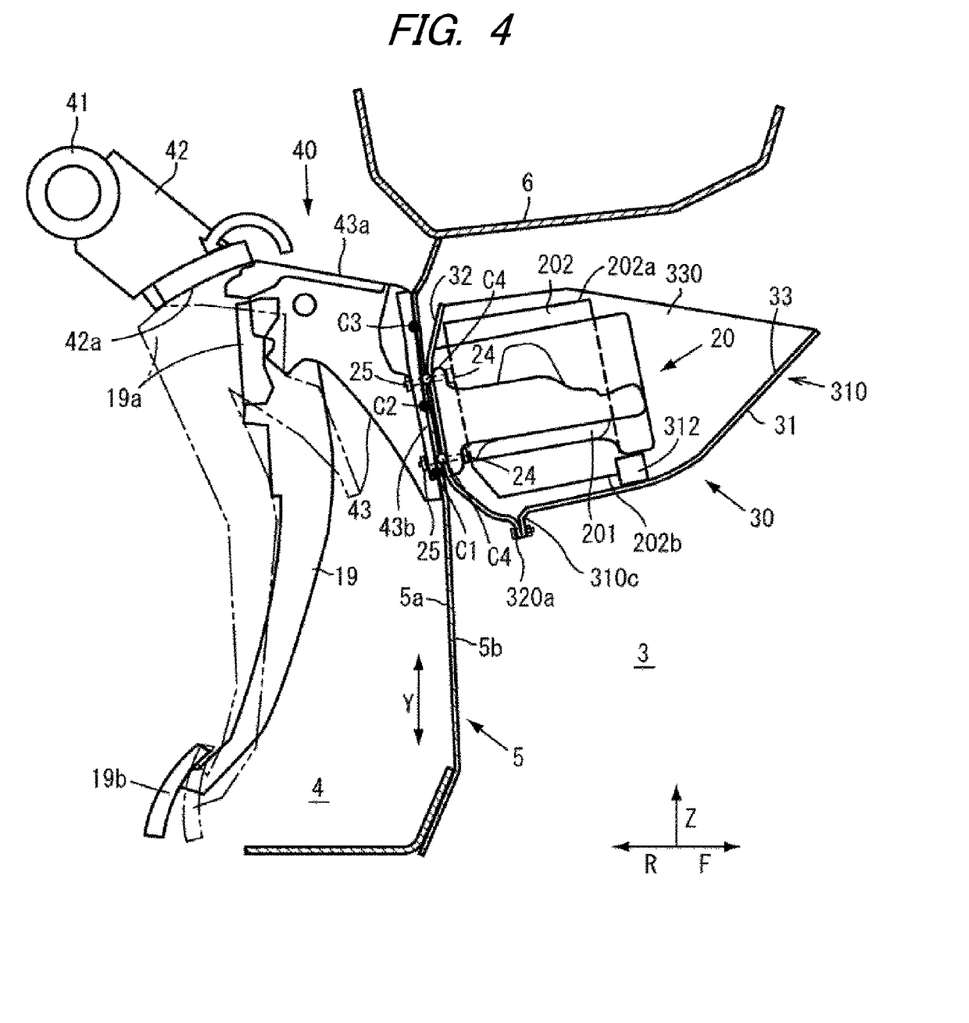
FIG. 4 is a view illustrating a structure and an operation of a brake pedal backward displacement suppressing structure.
Figure 5A:
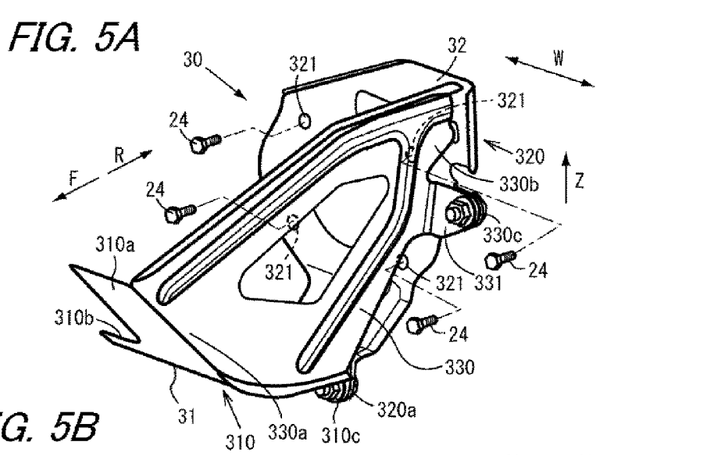
FIG. 5A is a perspective view of a protecting member of the deformation suppressing structure, viewed from the front of the vehicle.
Figure 5B:
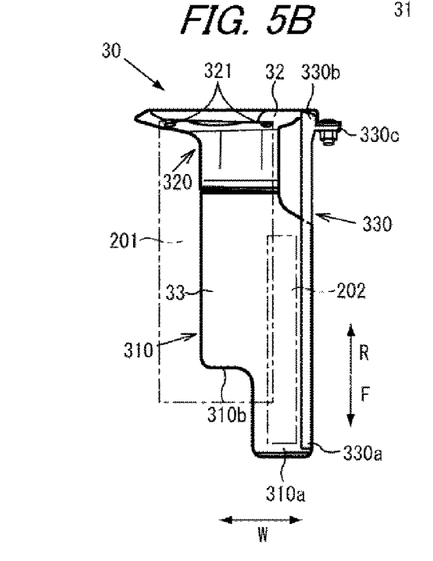
FIG. 5B is a top view of the protecting member.
Figure 5C:
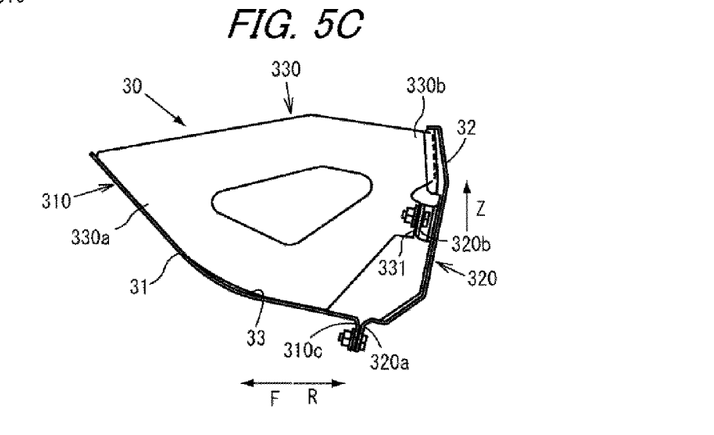
FIG. 5C is a left side view of the protecting member.
Figure 5D:
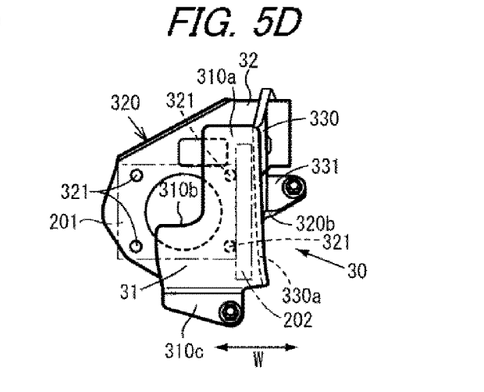
FIG. 5D is a front view of the protecting member.

As shown in FIG. 4, the brake pedal 19 is attached to the inner surface 5a of the dash panel 5 via a brake pedal backward displacement suppressing structure 40. The brake pedal backward displacement suppressing structure 40 may have a known structure. For example, the brake pedal backward displacement suppressing structure 40 has a first bracket 42 disposed in the cabin 4 and fixed to a deck cross member 41 extending in the vehicle width direction W and a second bracket 43 fixed to the inner surface 5a of the dash panel 5, to attach the brake pedal 19 to the second bracket 43 in a rotatable manner. The first bracket 42 has an arc-shaped guide surface 42a inclining downward in the direction from the vehicle front side F toward the vehicle rear side R. The guide surface 42a may be configured as a upwardly convex curved surface. An upper part 43a of the second bracket 43 abuts the guide surface 42a. The second bracket 43 has a fixing surface 43b fixed to the inner surface 5a of the dash panel 5. That is, the brake pedal 19 is attached to the inner surface 5a of the dash panel 5 by the first bracket 42 and the second bracket 43 serving as a mounting member. The fixing surface 43b of the second bracket 43 is fixed along the vehicle vertical direction Y at three points indicated by black circles. The three fixing points C1, C2, C3 are provided in this order toward the vehicle upper side Z.

In the brake pedal backward displacement suppressing structure 40, when a collision load is applied from the vehicle front side F and the dash panel 5 is displaced toward the inside of the cabin 4, the upper part 43a of the second bracket 43 moves by being guided by the guide surface 42a. Then, as shown by the alternate long and two short dashes line in FIG. 4, the brake pedal backward displacement suppressing structure 40 causes a rotary motion that displaces a lower part 19b of the brake pedal 19 protruding into the cabin 4, toward the inner surface 5a of the dash panel 5 while moving an upper part 19a of the brake pedal 19 toward the inside of the cabin 4, thereby suppressing the backward displacement of the brake pedal 19.

Figure 3:
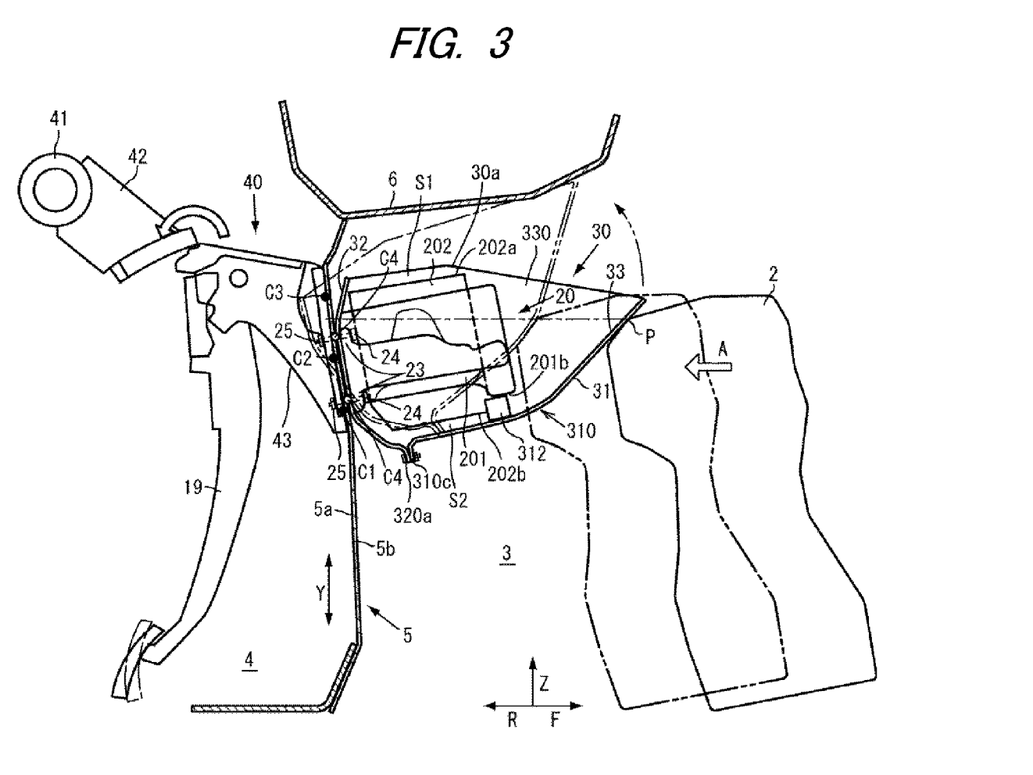
FIG. 3 is a side view illustrating a configuration of the deformation suppressing structure.

To ensure the function of the brake pedal backward displacement suppressing structure 40 even when the dash panel 5 is backwardly displaced by the BOS 20, in the present embodiment, as shown in FIGS. 2 and 3, a protecting member 30 is provided to accommodate the BOS 20 inside the protecting member 30, and the protecting member 30 and the BOS 20 are provided to be displaceable in a direction different from a backward movement direction A of the engine 2, thereby protecting the BOS 20, and suppressing the amount of displacement (the amount of backward displacement) of the dash panel 5 toward the inside of the cabin 4. In the present embodiment, the direction different from the backward movement direction A is the direction toward the vehicle upper side Z.

Next, the structure of the protecting member 30 will be described.

The protecting member 30 is made of a metal, and as shown in FIG. 3, is fixed to the outer surface 5a of the dash panel 5. The protecting member 30 and the dash panel 5 are fixed to each other at fixing points C4 indicated by white circles. The protecting member 30 has a guide surface 31 arranged to face the engine 2 and to contact the engine 2 such that a contact point P at which the guide surface 31 contacts the engine 2 changes during the backward movement of the engine 2 at the time of a collision of the vehicle 10. The protecting member 30 also has a contacting portion 32 arranged to contact the outer surface 5b of the dash panel 5 on the vehicle upper side Z of the fixing points C4 between the protecting member 30 and the dash panel 5 and on the vehicle upper side Z of the contact point P at which the protecting member 30 contacts the engine 2 (i.e. the contacting portion 32 is arranged to contact the dash panel 5 at a location above the fixing points C4 and above the contact point P). The contacting portion 32 is configured as a surface that is upwardly inclined in the direction from the vehicle rear side R toward the vehicle front side F. The protecting member 30 is configured such that a space S1 is provided between the protecting member 30 and the upper part 202a of the control board 202 of the BOS 20 accommodated in the protecting member 30 and such that an upper part 30a of the protecting member 30 is arranged above the upper part 202a of the control board 202.

As shown in FIGS. 5A to 5D, the protecting member 30 has a guide member 310 having the guide surface 31, a fixing member 320 having the contacting portion 32, and a coupling member 330 disposed between the guide member 310 and the fixing member 320.

The guide member 310 is a plate-form member in which one side portion 310a situated on the side of the control board 202 in the vehicle width direction W is formed in a size where the control board 202 falls within its projected area when viewed from the vehicle front side F. In the guide member 310, the side of the other side portion 310b in the vehicle width direction W is formed so as to be low in height in such a manner as to be notched with respect to the one side portion 310a, and part thereof on the side of the hydraulic pressure circuit portion 201 is formed so as to be exposed to the outside of the protecting member 30. This is in order to secure the cooling performance of the hydraulic pressure circuit portion 201 and in order to secure the workability at the time of the attachment. The point P at which the guide member 310 contacts the engine 2 is on the side of the one side portion 310a. The guide member 310 has an attachment flange 310c formed in a lower part thereof. The guide member 310 is attached to the fixing member 320 to be integrated therewith by fastening the attachment flange 310c to an attachment portion 320a provided in a lower part of the fixing member 320 by using a bolt and a nut as fastening members. The guide surface 31 is configured as an arc-shaped surface inclining downward in the direction from the vehicle front side F toward the vehicle rear side R. The guide surface 31 inclining downward in the direction from the vehicle front side F toward the vehicle rear side R may not be configured as an arc-shaped surface, and may be configured as a downwardly convex curved surface having a different shape, or simply as a flat inclined surface.

As shown in FIG. 3, the guide member 310 is configured such that a space S2 is formed between the guide member 310 and the lower part 202b of the control board 202, and such that the guide member 310 abuts a lower part 201b of the hydraulic pressure circuit portion 201. In the present embodiment, on an inner surface 33 of the guide member 310 on a side opposite to the guide surface 31, a spacer 312 made of a metal (e.g., an aluminum alloy) and formed separately from the guide member 310 is disposed as a protruding portion abutting on the lower part 201b of the hydraulic pressure circuit portion 201. A protruding portion corresponding to the spacer 312 may be molded integrally with the guide member 310.

The fixing member 320 is a plate-form metal member that is bonded to the outer surface 5b of the dash panel 5 situated in the driving unit space 3 and constitutes the mounting member of the BOS 20. The fixing member 320 has a plurality of attachment holes 321 formed thereon. The pitch of the attachment holes 321 is the same as that of a plurality of fixing holes 23 (see FIG. 2) formed on the BOS 20. To attach the fixing member 320 and the BOS 20, as shown in FIG. 3, bolts 24 serving as common fastening members are inserted into the attachment holes 321, the fixing holes 23 and attachment holes formed on the outer surface 5b of the dash panel 5 and nuts 25 are screwed to the bolts 24 to thereby jointly fasten and fix the fixing member 320 and the BOS 20 to the dash panel 5. The fixing member 320 is fixed to the dash panel 5 at the fixing points C4. In the present embodiment, there are four fixing points C4. The contacting portion 32 provided on the fixing member 320 is formed so as to extend to above the brake pedal fixing point C3 which is the highest one of the brake pedal fixing points.

The coupling member 330 formed of a plate-form member made of a metal is previously integrated with the guide member 310 in such a manner that one end edge 330a situated on the vehicle front side F is fixed to the guide member 310 by welding or the like. On the other end edge 330b of the coupling member 330 situated on the vehicle rear side F (the side of the fixing member 320), an attachment portion 331 is formed. The coupling member 330 is attached to the fixing member 320 to be integrated therewith by fastening the attachment portion 331 to an attachment portion 320b provided on a side portion of the fixing member 320 by using a bolt and a nut as fastening members. The attachment portion 331 of the coupling member 330 and the attachment portion 320b of the fixing member 320 are formed so as to be situated below the contacting portion 32.

The coupling member 330 and the guide member 310 are fixed by being attached to the fixing member 320 after the BOS 20 is attached and fixed to the dash panel 5 through the fixing member 320. This is because if the coupling member 330 is attached to the fixing member 320 before the BOS 20 is attached and fixed, it becomes an obstacle to the attachment work of the BOS 20.

Figure 6:
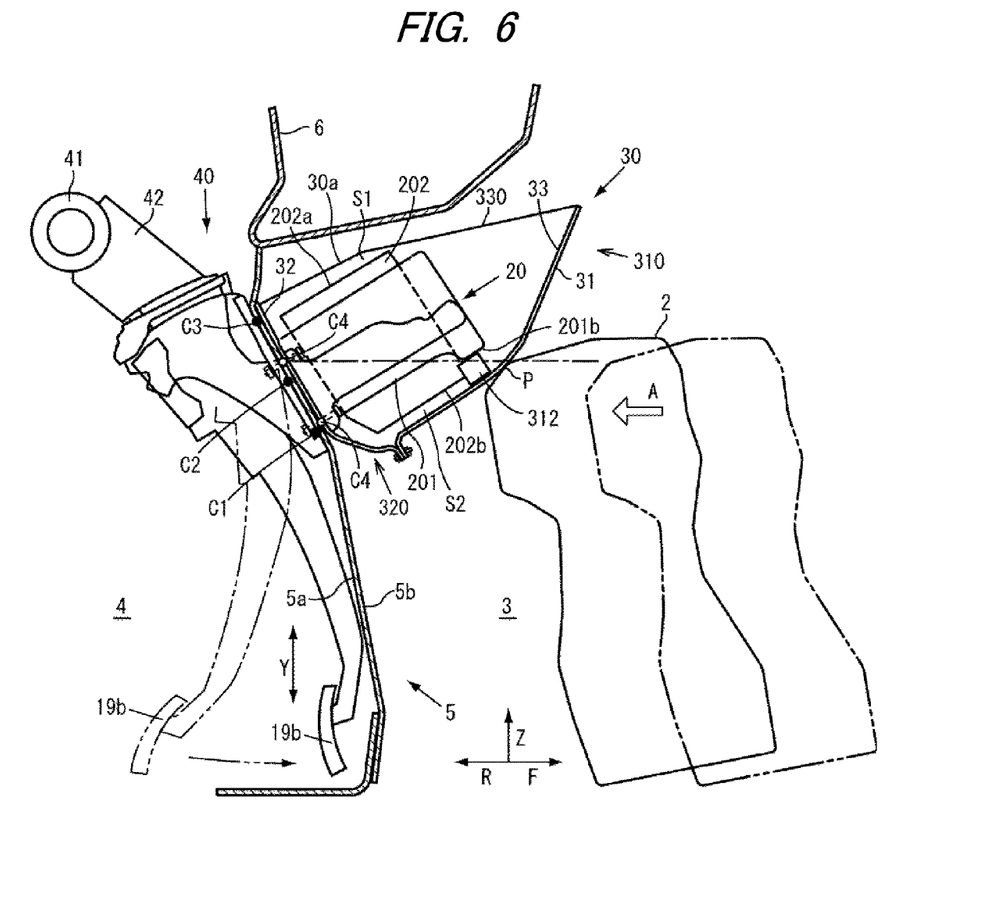
FIG. 6 is a side view illustrating a condition of the deformation suppressing structure after a vehicle collision.

By providing the protecting member 30 having such a configuration to accommodate the BOS 20, as shown in FIG. 6, when the engine 2 hits the guide surface 31 of the protecting member 30 at the time of a collision of the vehicle 10, the protecting member 30 is displaced toward the vehicle upper side Z (in the direction Z) while being supported at the fixing points C4 and in accordance with the backward movement of the engine 2. Accordingly, the backward moving amount of the dash panel 5 is reduced, and the deformation of the dash panel 5 toward the inside of the cabin 4 by the BOS 20 can be suppressed while at the same time protecting the BOS 20 (an example of the brake component).

That is, when the engine 2 is backwardly displaced toward the vehicle rear side R and hits the protecting member 30 at the time of a front collision, the guide surface 31 configured to provide a sliding structure for the contact point P between the protecting member 30 and the engine 2 causes, after the contact between the engine 2 and the guide surface 31 of the protecting member 30, a deflecting behavior toward the vehicle upper side Z in a direction different from the backward movement direction A of the engine 2. This reduces the amount by which of the BOS 20 is pushed toward the inside of the cabin 4 by the engine 2, so that the backward moving amount of the dash panel 5 toward the inside of the cabin 4 can be reduced.

The protecting member 30 is configured such that its upper part 30a is provided above the upper part 202a of the control board 202 so that a space S1 is formed between the upper part 30a of the protecting member 30 and the upper part 202a of the control board 202. As shown in FIG. 6, this makes it possible to avoid the cowl top 6 and the control board 202 from contacting each other when the protecting member 30 rotates toward the vehicle upper side Z. This leads to prevention of breakage of the control board 202.

On the guide member 310 of the protecting member 30, where the guide surface 31 is formed, the spacer 312 is provided such that the spacer 312 abuts the lower part 201b of the hydraulic pressure circuit portion 201 and such that the space S2 formed between the guide member 301 and the lower part 202b of the control board 202. Therefore, when the backwardly moved engine 2 hits the guide surface 31, its impact is absorbed by the hydraulic pressure circuit portion 201 having a greater rigidity than the control board 202, and the control board 202 and the guide member 310 are prevented from contacting each other, whereby the control board 202 is prevented from being damaged.

Since the contacting portion 32 of the protecting member 30 extends above the brake pedal fixing point C3 as shown in FIG. 3, the deformation of the fixing member 320 causes the fixing member 320 to push all the brake pedal fixing points C1, C2, C3 toward the vehicle rear side R. Therefore, partial backward movement (displacement toward the inside of the cabin 4) of the dash panel 5 by the protecting member 30 and the BOS 20 can be suppressed, the function of the brake pedal backward displacement suppressing structure 40 can be secured, and the backward movement amount of the brake pedal 19 can be reduced.

While the engine 2 has been described as an example the weight component that faces the BOS 20, the motor 11 or the battery may be arranged as the weight component that faces the BOS 20, depending on a configuration of the vehicle 10. Also in such instances, the protecting member 30 may be provided such that the protecting member 30 is displaced toward the vehicle upper side Z while being supported at the fixing points C4 in accordance with the backward movement of the motor 11 or the battery, whereby the backward moving amount of the dash panel 5 is reduced, and the deformation of the dash panel 5 toward the inside of the cabin 4 by the BOS 20 can be suppressed while at the same time protecting the BOS 20.

While as the attachment structure of the brake pedal 19, an example attached to the dash panel 5 through the brake pedal backward displacement suppressing structure 40 is described, the present invention is not limited to this structure. For example, by applying the protecting member 30 also to a structure having no brake pedal backward displacement suppressing structure 40, deformation of the dash panel 5 to the inside of the cabin 4 by the BOS 20 can be suppressed.

While the brake component is described with the BOS 20 as an example, it may be, for example, a known master cylinder of the braking devices 21.

What is claimed is:

1. A deformation suppressing structure of a vehicle, the deformation suppressing structure being configured to suppress a deformation of the vehicle at a time of a collision, the deformation suppressing structure comprising:
   a dash panel separating a driving unit space on a front side of the vehicle and a vehicle interior space on a rear side of the vehicle from each other, the driving unit space providing a space for installing a weight component, and the vehicle interior space providing a space for a passenger to ride on the vehicle;
   a brake component for controlling a hydraulic pressure of a brake system disposed inside the driving unit space and between the weight component and the dash panel; and
   a protecting member fixed to the dash panel and accommodating the brake component inside the protecting member,
   wherein the protecting member comprises:
   a guide surface arranged to face the weight component and configured such that a contact point at which the guide surface contacts the weight component changes during a backward movement of the weight component at the time of the collision of the vehicle;
   a contacting portion arranged to contact the dash panel at a location above a fixing point at which the protecting member and the dash panel are fixed to each other and above the contact point,
   wherein the brake component comprises a control board configured to switch a flow channel of a hydraulic pressure circuit portion, and
   wherein an upper part of the protecting member is arranged above an upper part of the control board such that a space is formed between the protecting member and the upper part of the control board.

* * * * *